(No Model.)
C. H. LAND.
ARTIFICIAL TOOTH CROWN.
No. 405,167. Patented June 11, 1889.
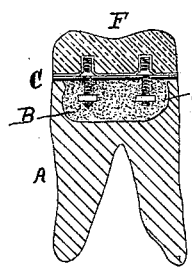 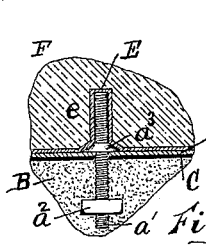 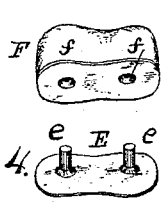 
Fig. 1.  Fig. 2.  Fig. 3.  Fig. 7.
 
Fig. 4.  Fig. 6.
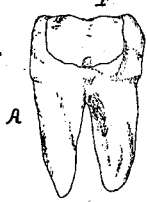 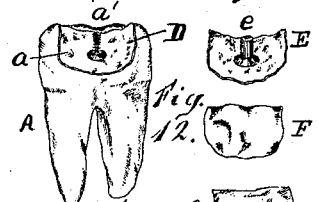 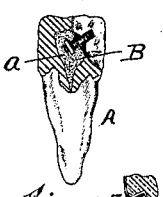
Fig. 8.  Fig. 5.
 
Fig. 9.  Fig. 10.  Fig. 11.  Fig. 14.
Fig. 12.
Fig. 13.  Fig. 15.
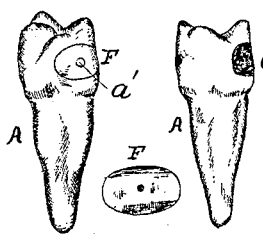  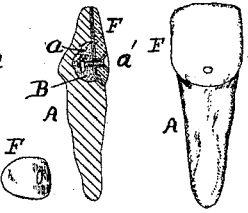  
Fig. 16.  Fig. 18.  Fig. 20.  Fig. 21.  Fig. 22.  Fig. 23.
Fig. 17.  Fig. 19.
Attest.  
F. W. MacQueston  
Alfred M. Low
Inventor.  
Charles H. Land  
By Newell S. Wright  
Attorney

UNITED STATES PATENT OFFICE.

CHARLES H. LAND, OF DETROIT, MICHIGAN.

ARTIFICIAL TOOTH-CROWN.

SPECIFICATION forming part of Letters Patent No. 405,167, dated June 11, 1889.

Application filed March 14, 1888. Serial No. 267,139. (No model.)

*To all whom it may concern:*

Be it known that I, CHARLES H. LAND, a citizen of the United States, residing at Detroit, county of Wayne, State of Michigan, have invented a certain new and useful Improvement in Anchoring Devices for Artificial Crowns and Fillings; and I declare the following to be a full, clear, and exact description of the invention, such as will enable others skilled in the art to which it appertains to make and use the same, reference being had to the accompanying drawings, which form a part of this specification.

My invention relates to certain new and useful improvements in the art of restoring decayed teeth, and has special reference to a line of inventions embodied in United States Letters Patent No. 375,167, granted to me December 20, 1887, for an improvement in filling teeth; also in a pending application, Serial No. 247,454, filed August 20, 1887, for an improvement in artificial teeth, and which line of inventions is furthermore developed herein.

It is a well-known fact in dentistry that certain substances used in filling teeth—such as oxyphosphate of zinc and oxychloride of zinc—are liable to be injured and rendered unstable by the action of the fluids of the mouth; and yet they have certain valuable qualities in them, when properly protected from the action of said fluids, whereby they become exceedingly useful as an anchoring medium to form the base or support for devices herein enumerated.

It is the object of my present invention, first, to effectually overcome such difficulties and prevent injury resulting to such substances in localities contemplated by my invention; second, to provide an efficient and satisfactory method for connecting the tooth crown or section with the decayed tooth, and, third, to surmount the decayed tooth with a plate and engage the tooth crown or section thereon.

My invention, as herein described and shown, therefore contemplates the general construction and combination of devices and appliances, as hereinafter more fully set forth, and more particularly pointed out in the claims.

I will now proceed to describe my invention, which I carry out as follows:

In the drawings illustrating my invention, Figure 1 is a vertical section of a tooth showing my invention applied thereto. Fig. 2 is an enlarged view of details in section. Figs. 3, 4, 5, and 6 are separate views of details. Fig. 7 is a view in elevation of a tooth, showing my invention applied. Fig. 8 shows the tooth fitted ready for the application of the porcelain section. Fig. 9 illustrates a modification, where my invention is applied to fill a tooth-cavity on the side. Fig. 10 is a view of the same ready for the application of the porcelain filling. Figs. 11, 12, and 13 are separate views of details. Fig. 14 shows my invention applied to a different cavity. Fig. 15 is a view in detail of the porcelain section fitted thereupon. Fig. 16 is a modification showing the adaptation of my invention to another form of denture. Figs. 17, 18, and 19 are different views illustrating details embodied in Fig. 16. Figs. 20, 21, 22, and 23 are also different forms illustrative of my improvement.

A represents a tooth of any description and which may have a cavity of any form, or decayed portion, as at $a$. When the cavity or decayed portion has been properly prepared for filling, building up, or crowning, as the case may be, in order to secure firm anchorage for the required filling, section, or crown, I employ a bolt $a'$ of suitable size and form, provided with a suitable nut $a^2$, and preferably with a shoulder $a^3$. This nut I embed in the tooth by means of the well-known cements, as those already described, as shown at B, or instead of the cement by gold or amalgam filling. The bolt with its nut is located in place and the cement or said filling caused to hold the nut in place, said cement or filling forming a foundation or support therefor, the end of the bolt protruding therefrom. When the foundation or support has been thus applied about the nut and is once set, the nut will be firmly held in place, while the bolt may be disengaged therefrom, and vice versa. Over this foundation or support with its embedded nut I locate my protecting substance, as of gutta-percha, rubber, or analogous substance, indicated at C.

I have found that a small percentage of Canada balsam mixed with gutta-percha forms one of the most desirable water-proof cements for this purpose and for protecting the cements of the foundation or support from the action of the fluids of the mouth, such a compound being remarkably adhesive. If gold or amalgam filling be employed to constitute the foundation or support, the protecting substance might, if desired, be omitted without departing from the principle of my invention, as they would not require to be protected from the fluids of the mouth to preserve their permanency and durability. With the application of this protecting substance, however, a thin metallic plate D—as, for instance, of gold—is applied as a covering, the said covering being perforated, as at d, to permit the passage of the bolt. The covering is rigidly held in place upon the tooth with the protecting substance intermediate between it and the foundation or support by re-engaging the bolt in the nut, the shoulder of the bolt binding the covering down in place in a most effectual manner. The nut with its foundation thus constitutes a firm anchoring device. The covering may be fitted to any desired shape, and any desired number of nuts and bolts may be employed. When the covering is thus located and held firmly upon the protecting substance, it is evident that the fluids of the mouth are effectually excluded from the foundation-cement, and in consequence the anchoring device is in no danger of ever becoming loosened. Upon this covering-plate and the extended bolt I next fit a matrix E, constructed preferably of a thin piece of platinum, swaged or burnished into the cavity or upon the tooth, so as to obtain a perfect impression of the remaining contour of the lost portion of the tooth with the covering and extended end of the bolt. I then use this matrix as a mold in the manner described in my above-mentioned patent, to form a solid porcelain section, felting, or crown of desired contour F, to fit upon the tooth, the porcelain sections, &c., being made of porcelain paste or body molded into the matrix and baked.

When prepared, both the matrix and section may be cemented in place, in which case the porcelain section may be cemented into the matrix. When the porcelain section, however, has been thus formed, the matrix may be further dispensed with, if preferred, without departing from the principles of my invention.

It will be particularly observed that in fitting the matrix over the extended end of the bolt a tubular chamber or cell, as at e, and a corresponding chamber or cell in the porcelain section, as at f, are formed, this union of the matrix and section upon the adjacent covering and bolt rendering the structure exceedingly firm.

The covering-plate D may be flanged at its edges, preferably, to slightly overlap the edges of the tooth adjacent thereto. Such a construction is shown, for instance, at d', Fig. 6. The flanging of the said plate will facilitate the end desired where practicable; but I do not limit myself thereto.

In the modifications illustrated in Figs. 16 to 23, inclusive, instead of fitting the matrix upon a partially-extended bolt, as previously shown, a bolt of special construction may be employed, said bolt extended so as to be inserted from the exterior of the porcelain section when said section has been formed, the anchoring device being adapted for such operation, as well as that already hereinbefore described. The bolt or screw shown in said latter figures may be made with a porcelain head, and which may be polished down when in place. This construction, however, forms the subject-matter of a separate application filed of even date herewith, and is here illustrated to show the adaptation of the anchoring device thereto.

In some cases the plate D may be omitted, if desired, the matrix or porcelain section being engaged upon the anchoring device with an intervening application of the protecting substance to exclude the fluids of the mouth from gaining access to the foundation or support. In case the plate D was dispensed with or otherwise, instead of a screw, in some cases an anchoring-post would answer all purposes.

What I claim is—

1. In the process of restoring decayed teeth, embedding an anchoring-nut in filling material within the tooth-cavity, and engaging a tooth crown or section thereon by means of a screw, and uniting said crown or section with said nut, substantially as set forth.

2. In the process of restoring decayed teeth, embedding an anchoring-nut in filling material within the tooth-cavity, applying to the surface of the filling material a fluid-tight protecting-coat, and engaging a tooth crown or section thereupon by means of a screw uniting said crown or section with said nut, substantially as set forth.

3. In the process of restoring decayed teeth, embedding an anchoring-nut in filling material within the tooth-cavity, applying to the surface of the filling material a fluid-tight protecting-coat, surmounting said coat by a plate, and engaging the tooth crown or section thereupon by means of a screw uniting said crown or section with said nut, substantially as set forth.

In testimony whereof I sign this specification in the presence of two witnesses.

CHARLES H. LAND.

Witnesses:
N. S. WRIGHT,
GEORGE H. HIGGS.